(12) United States Patent
Milby

(10) Patent No.: US 7,509,332 B1
(45) Date of Patent: Mar. 24, 2009

(54) CUSTOMIZED INDEXES FOR USER DEFINED DATA TYPES

(75) Inventor: Gregory H. Milby, San Marcos, CA (US)

(73) Assignee: Tevaclata US, Inc., Miamisburg, OH (US)

( * ) Notice: Subject to any disclaimer, the term of this patent is extended or adjusted under 35 U.S.C. 154(b) by 382 days.

(21) Appl. No.: 11/303,286

(22) Filed: Dec. 16, 2005

(51) Int. Cl.
*G06F 17/30* (2006.01)

(52) U.S. Cl. .............................. 707/101; 707/1; 707/3; 707/100; 707/102

(58) Field of Classification Search ............... 707/1, 707/3, 8, 10, 100–104
See application file for complete search history.

(56) References Cited

U.S. PATENT DOCUMENTS

| | | | |
|---|---|---|---|
| 5,640,584 A | 6/1997 | Kandasamy et al. | |
| 5,864,842 A | 1/1999 | Pederson et al. | |
| 5,870,747 A * | 2/1999 | Sundaresan | 707/101 |
| 5,872,904 A | 2/1999 | McMillen et al. | |
| 5,884,299 A | 3/1999 | Ramesh et al. | |
| 6,081,806 A * | 6/2000 | Chang et al. | 707/8 |
| 6,219,662 B1 * | 4/2001 | Fuh et al. | 707/3 |
| 6,957,205 B1 * | 10/2005 | Liongosari | 706/45 |
| 2003/0004999 A1 * | 1/2003 | Walker et al. | 707/513 |
| 2003/0093408 A1 | 5/2003 | Brown et al. | |

OTHER PUBLICATIONS

Peter Gulutzan&Trudy Pelzer, "SQL-99 Complete, Really," pp. 30-33, 517-539 (1999).

* cited by examiner

*Primary Examiner*—Cam-Linh Nguyen
(74) *Attorney, Agent, or Firm*—Trop, Pruner & Hu P.C.

(57) ABSTRACT

A user-customized index is stored in a storage, with the index defined on at least one column of a first table. In response to modification of the first table, a user-defined routine is invoked to update the user-customized index.

16 Claims, 5 Drawing Sheets

INDEX DICTIONARY TABLE

| TABLE | COLUMN | INDEX CONTEXT | CUSTOM INDEX FLAG | INSERT INDEX STORAGE ROUTINE ID | UPDATE INDEX STORAGE ROUTINE ID | INDEX SEARCH ROUTINE ID | |
|---|---|---|---|---|---|---|---|
| T1 | A | CTX1 | TRUE | IISR1 | UISR1 | ISR1 | ← 102 |
| T2 | C | CTX2 | FALSE | | | | ← 104 |
| | | | ⋮ | | | | |
| $T_X$ | B | $CTX_X$ | TRUE | $IISR_X$ | $UISR_X$ | $ISR_X$ | ← 106 |
| | | | ⋮ | | | | |

FIG. 2
INDEX DICTIONARY TABLE

| TABLE | COLUMN | INDEX CONTEXT | CUSTOM INDEX FLAG | INSERT INDEX STORAGE ROUTINE ID | UPDATE INDEX STORAGE ROUTINE ID | INDEX SEARCH ROUTINE ID |
|---|---|---|---|---|---|---|
| T1 | A | CTX1 | TRUE | IISR1 | UISR1 | ISR1 |
| T2 | C | CTX2 | FALSE | | | |
| ... | | | | | | |
| Tx | B | CTXx | TRUE | IISRx | UISRx | ISRx |

102 → INSERT INDEX STORAGE ROUTINE ID
104 → UPDATE INDEX STORAGE ROUTINE ID
106 → INDEX SEARCH ROUTINE ID

CUSTOMIZED INDEXES FOR USER DEFINED DATA TYPES

BACKGROUND

Indexes are often used in relational database management systems to improve performance when accessing (reading or writing) data contained in relational tables stored in the database management system. An index (typically in the form of an index table) stores data values (of a column in a base relational table) and pointers to the rows in the base relational table where those data values occur. An index table can be arranged in ascending or descending order (or some other defined order such as a hash order) so that the database management system can quickly search the index table to find row(s) containing a particular data value for a given column. A database management system can then follow the pointer(s) contained in the index table to locate the row (or rows) containing the data value. An index can also be defined on multiple columns (instead of just one column) of a base table.

Typically, indexes are defined on predefined data types that are supplied by database software executable in a database management system. Examples of predefined data types include an integer data type, character data type, and so forth. With more recent developments in database technology, relational tables are able to store data of other types, such as spatial geometry, image, audio, video, and other forms of more complex data. The storage of more complex data types in relational tables has been enabled by SQL: 1999 (or SQL3), which supports user-defined data types (UDTs).

UDTs allow a user of database software to specify the data type (other than data types offered with the database software) that is to be used to store data. For example, a spatial geometry data type can be defined to store map data, a video data type can be defined to store video data (e.g., movies), an audio data type can be defined to store audio files (e.g., music files), an image data type can be defined to store pictures, a text data type can be defined to store documents (e.g., Word documents), and so forth.

Conventionally, efficient techniques have not been provided to define indexes for complex data types that are UDTs. Although the database software vendor or manufacturer can invest engineering resources to define various types of formats for storing indexes for UDTs, such an investment of engineering resources is associated with substantial costs. Moreover, the database software vendor is typically unable to address all possible UDTs that can be created by users of the database software. The result is that even after substantial investments of resources by the database software vendor to create different formats for indexes on various UDTs, the database software would still not be able to provide the desired level of flexibility in providing indexes for data types not considered by the database software vendor.

SUMMARY

In general, mechanisms are provided to enable users to define customized indexes for various user-defined data types.

Other or alternative features will become more apparent from the following description, from the drawings, and from the claims.

BRIEF DESCRIPTION OF THE DRAWINGS

FIG. 2 depicts a data dictionary stored in the database system of FIG. 1, in accordance with an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
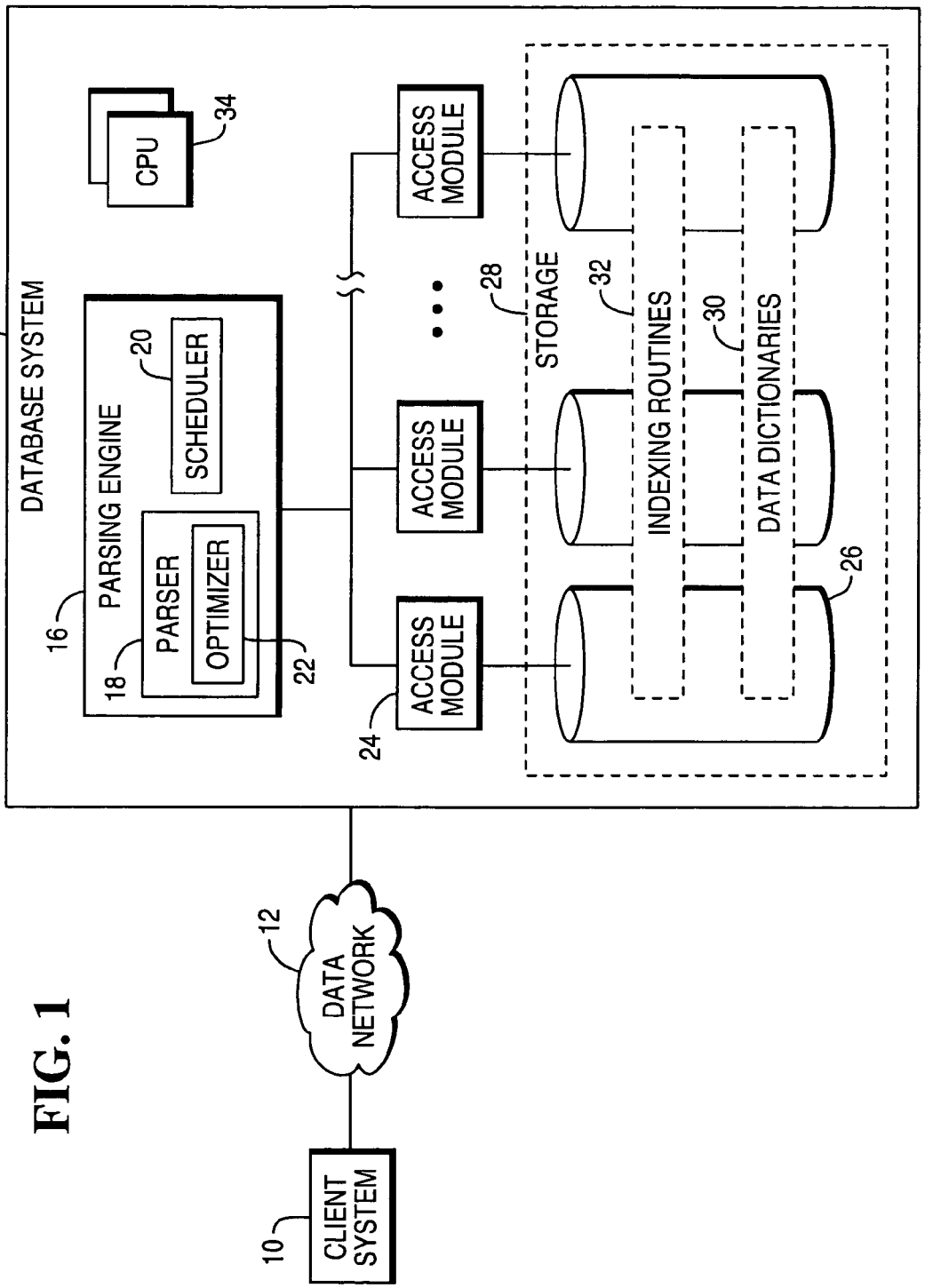
FIG. 1 is a block diagram of an example arrangement that includes a database system.

FIG. 1 illustrates an example arrangement in which a client system 10 is coupled to a database system 14 over a data network 12. Examples of the data network 12 include a local area network (LAN), a wide area network (WAN), the Internet, and so forth. The client system 10 is capable of issuing queries according to a standard database query language to the database system 14 to access or update data or to create or alter data structures (e.g., tables, rows, and so forth). One example of a standard database query language is the Structured Query Language (SQL), as promulgated by the American National Standards Institute (ANSI).

The database system 14 includes a storage 28 that stores various data, including relational tables. Each relational table contains rows and columns. Note that the data type for any particular column can be a user-defined data type (UDT). A standard database query language that provides for creation of UDTs is SQL-99 or SQL: 1999 (also referred to as SQL3). Although reference is made to SQL-99 in this discussion, other embodiments can employ other types of standard database query languages that provide for UDTs.

A UDT is different from predefined data types that are defined by database software provided with the database system 14. Examples of predefined data types include integers, real numbers, character strings, and so forth. Unlike a predefined data type, a UDT is created by a user of the database software using CREATE TYPE statements defined by SQL-99 or some other database query language. UDTs can include relatively complex data types, such as geospatial data types, video data types, image data types, audio data types, text data types, and so forth.

In accordance with some embodiments, indexes can be maintained on one or more selected columns of each table, including columns according to UDTs. For enhanced efficiency, formats of indexes for columns according to different UDTs can vary. Note that a format for storing an index for one UDT may not be efficient for storing an index of another UDT. The varying formats of indexes are user-definable (to provide user-customized indexes) so that users of the database software have flexibility in how indexes are maintained for different UDTs. By allowing users to define formats of indexes for UDTs, a database software vendor does not have to predefine index formats that would reduce flexibility and efficiency. As an example, the customized format of an index for data according to a spatial geometry type can be an R-tree format. Other customized formats are used for other data types, such as image, video, audio, text, and so forth. The customized formats of customized indexing for UDTs are different from predefined formats of predefined indexes provided by the database software. A user-customized or customized index refers to an index having a format that can be specified or selected by a user of the database software; in other words, the format of the customized index is not predefined by the database software.

An index (typically in the form of an index table) stores data values (of a column in base relational table) and pointers to the rows in the base relational table where those data values occur. An index table can be arranged in ascending or descending order (or some other defined order such as a hash order) so that the database management system can quickly search the index table to find row(s) containing a particular data value for a given column. A database management system can then follow the pointer(s) contained in the index table to locate the row (or rows) containing the data value. An index can also be defined on multiple columns (instead of just one column) of a base table. An index table that contains a customized index has entries according to a user-customizable format. Thus, one index table maintained for a table column according to a first UDT can have a customized format that is different from the format of another index table maintained for another table column according to a different UDT.

To enable usage of customized indexes of varying formats for different UDTs, a database software vendor can define "footprints" for several indexing routines to allow a user to create indexing routines 32 for a UDT. A "footprint" for an indexing routine refers to the general structure defined for the routine that a user of the database software can use to generate the actual indexing routine. An indexing routine is a software routine that is invocable to perform some task with respect to customized indexes associated with the corresponding UDT. The task includes any one of searching indexes, modifying indexes, or other tasks.

In one example, a footprint can include several CREATE FUNCTION statements that define "dummy" indexing routines with their associated input and output parameters. Following the model represented by the footprint, a user can employ similar CREATE FUNCTION statements to create actual indexing routines for manipulating indexes for a specific UDT. In any particular database system, the technique of developing user created indexing routines can be applied to just one UDT or to several or many UDTs. Each UDT would be associated with its own set of indexing routines 32 that are invoked for manipulating the respective indexes for the UDT.

As further shown in FIG. 1, the database system 14 includes a parsing engine 16, which has a parser 18 and a scheduler 20. The parser 18 receives database queries (such as those submitted by the client system 10), parses the received query, and generates executable steps. The parser 18 includes an optimizer 22 that generates query plans, selecting the most efficient from among the plural query plans. The scheduler 20 sends the executable steps generated by the parser 18 to multiple access modules 24 in the database system. The optimizer 22 uses indexes on table columns for determining which query plan is most efficient.

Each access module 24 performs the following tasks: inserts, deletes, or modifies contents of tables; creates, modifies, or deletes definitions of tables; retrieves information from definitions and tables; and locks databases and tables. In one example, each access module 24 is based on an access module processor (AMP) used in some TERADATA® database systems from NCR Corporation. Each access module 24 manages access of data in respective storage modules 26. The plural storage modules 26 make up the storage 28 of the database system 14. The presence of multiple access modules 24 and corresponding storage modules 26 define a parallel database system. In alternative embodiments, instead of database systems having multiple access modules, a database system with only one access module can be employed.

The access modules 24 and parsing engine 16 are part of the database software executable in the database system 14. The database software, along with the user created indexing routines 32, are executable on one or more central processing units (CPUs) 34 of the database system 14. In the example of FIG. 1, the components of the database system 14 are depicted as being part of one node. Note that the database system 14 can actually be implemented in a multi-node system where each node contains one or more access modules 24 and parsing engines 16 to provide a distributed database architecture.

FIG. 1 also shows data dictionaries 30 contained in the storage 28 of the database system 14. Data dictionaries include one or more dictionary tables, including an index dictionary table depicted in FIG. 2. The index dictionary table of FIG. 2 is used for storing contexts for respective indexes. These contexts are used by database software to access respective index tables. During processing of database queries, information can be retrieved from the index dictionary table and supplied to the database software to determine an optimal plan for resolving the query.

As indicated in the example dictionary table of FIG. 2, indexes are maintained for column A of table T1 (row 102 of the index dictionary table); column C of table T2 (row 104 of the index dictionary table); and column B of table Tx (row 106 of the index dictionary table). The index dictionary table includes various columns, including a "table" column (to identify the tables for which indexes are being maintained); a "column" column (to identify the column in the respective table for which indexes are being maintained); an "index context" column (to store context information that describes the respective index); a CustomIndexFlag (containing indicators for indicating whether customized indexing is being enabled for respective table columns); an "insert index storage routine ID" column (containing identifiers of insert index storage routines); an "update index storage routine ID" column (containing the identifiers of update index storage routines); and an "index search routine ID" column (containing identifiers of index search routines).

In accordance with some embodiments, files containing the customized indexes are stored in the native file system of the operating system of the database system. An example file system is the NTFS file system of a WINDOWS® NT operating system. In other implementations, other types of operating systems, such as Linux, Unix, and so forth, are also associated with their respective native operating systems. Storing the files containing the customized indexes in the file system of the native operating system allows for ease of use by a user.

In an alternative embodiment, files containing the customized indexes can be stored in the specialized file system provided by the database software (which is different from the operating system native file system). To enable such storage, the database software can specify an application programming interface (API) to facilitate the storing of indexes in the database software file system.

In a parallel database environment as depicted in FIG. 1, a file containing a customized index (such as in an index table) is distributed across plural access modules and corresponding storage modules.

An insert index storage routine identified by the index dictionary table of FIG. 2 is called for storing index data in an index table in response to an SQL INSERT statement (or other similar database query language statement) that inserts data into the corresponding base table. Similarly, an update index storage routine is used to store index data in an index table in response to an SQL UPDATE or SQL DELETE statement (for updating or deleting, respectively, data within a base table). An index search routine identified by the index dictionary table is used to search the index data in an index table.

Multiple customized indexes can be built on multiple table columns of one or more base tables. For example, a first customized index can be built on a column of a first table, and another customized index can be built on a column of a second table. Alternatively, a first customized index can be built on a first column of a table, while another customized index can be built on a second column of the same table. The indexing routines that correspond to the different customized indexes can be assigned different names so that the database software is able to invoke different indexing routines for accessing different customized indexes.

In the example index dictionary table of FIG. 2, CustomindexFlag is set to a first value (e.g., a true state) for column A of table T1 and column B of table Tx (to indicate customized indexing is enabled for these columns) in rows 102 and 106, respectively. On the other hand, CustomindexFlag is set to a second value (e.g., false state) for column C of table T2 (to indicate that customized indexing is not enabled for column C of table T2) in row 104. If CustomindexFlag is true, then user created indexing routines are associated with the index identified in the corresponding row. Thus, in the index dictionary table, column A of table T1 is associated with index context CTX1 and with indexing routines identified by IDs IISRI, UISR1, and ISR1. Similarly, user created indexing routines (having IDs IISRx, UISRx, and ISRx) and index context CTXx are associated with column B of table Tx (row 106 of the dictionary table). Note, however, that user created indexing routines are not associated with column C of table T2 (row 104 of the dictionary table) because CustomIndexFlag is set to false (in other words, the index for this column is not a customized index). Instead, the index for column C of table T2 is in the predefined format provided by the database software, and is associated with index context CTX2.

Customized indexes differ from indexes of a predefined format provided by the database software. The indexes of the predefined format is defined by code associated with the database software, which code is written by the database software vendor (the entity that sold or manufactured or otherwise provided the database software to users). Customized indexes, on the other hand, are defined by users of the database software (or defined by cooperation between users and the database software vendor). To manipulate these customized indexes, the user created indexing routines are provided, since the database software itself would be unable to handle the customized indexes. According to some embodiments, the customized indexes are provided for UDTs.

When processing of a database query involving access of one or more tables that have indexing enabled for one or more columns, the index dictionary table is accessed to retrieve the respective context information (in the "index context" column of the index dictionary table depicted in FIG. 2) to enable access of the respective one or more index tables for determining an optimal query plan. Also, in response to changes made to a table column on which indexing is defined, the index dictionary table is accessed to determine what indexing routines (if any) to invoke for updating the corresponding index tables.

Figure 3:
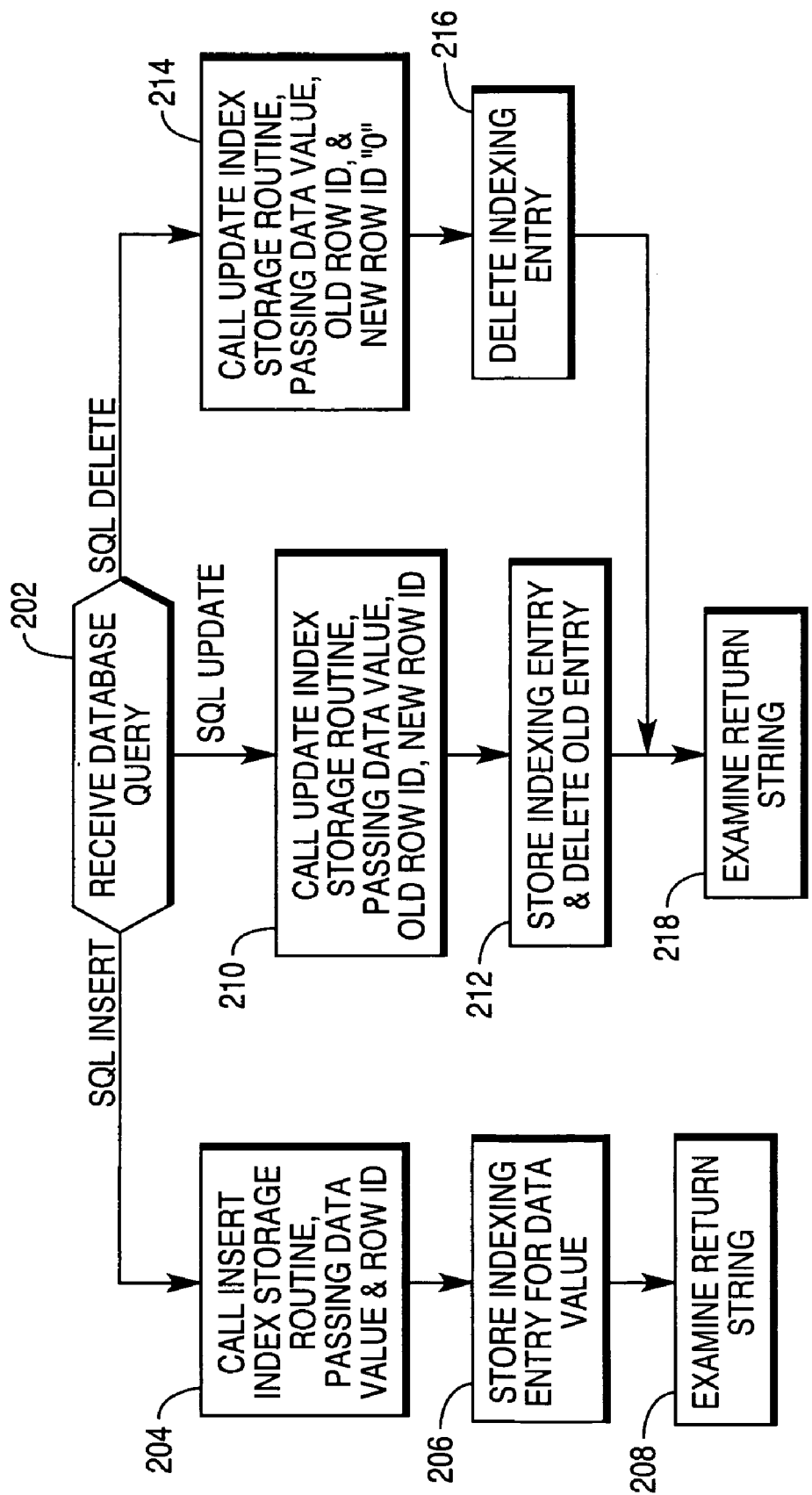
FIG. 3 is a flow diagram of a process of modifying customized indexes, in accordance with an embodiment.

Given that a user created customized index has been defined upon a particular column, processing according to FIG. 3 is performed in response to a database query that modifies the content of a base relational table containing the column on which indexing is defined. As shown in FIG. 3, in response to receiving (at 202) a database query, the database software determines which type of database query has been received, including an SQL INSERT statement, an SQL UPDATE statement, or an SQL DELETE statement. In response to any of these queries, the database software accesses (using a selected one of the indexing routines) a corresponding index table containing customized indexing to perform a corresponding update of the index table.

In response to an SQL INSERT statement that inserts a row into a base table, the database software calls (at 204) the corresponding insert index storage routine (identified by the index dictionary table for the given column). In the call of the insert index storage routine, the data value of the column on which the index is defined, as well as the row identifier of the inserted row, is passed to the index storage routine. The index storage routine then stores (at 206) an entry for the data value in the corresponding index table. The database software then examines (at 208) whether a return string from the insert index storage routine indicates an error occurred during storage processing for the index entry. Any error will be processed by the database software.

If the received database query is an SQL UPDATE statement, then the update index storage routine is called (at 210) by the database software. In the call of the update index storage routine, the updated data value, the original row identifier (identifier of the row that is to be deleted) and the new row identifier (of the new row that is to be added based on the UPDATE statement) is passed to the update index storage routine. The update index storage routine then stores (at 212) the new indexing entry in the index table. The return string is then examined (at 213) to determine if any error occurred.

If the received database query is an SQL DELETE statement, then the database software also calls (at 214) the update index storage routine. However, in this case, the parameters passed to the update index storage routine include the deleted data value, the original row identifier (identifier of the row that is to be deleted), and a new row identifier that has a predefined value, such as "0," to indicate that no new entry has been added to the base table, and thus the indexing entry in the index table can be deleted (at 216) by the update index storage routine. The return string is examined (at 218) for any error.

In a parallel database system environment such as that shown in FIG. 1, each indexing routine called in the process of FIG. 3 can be called by each access module for performing an update of a respective portion of the index table containing the customized index that is distributed across plural access modules and storage modules.

Figure 4:
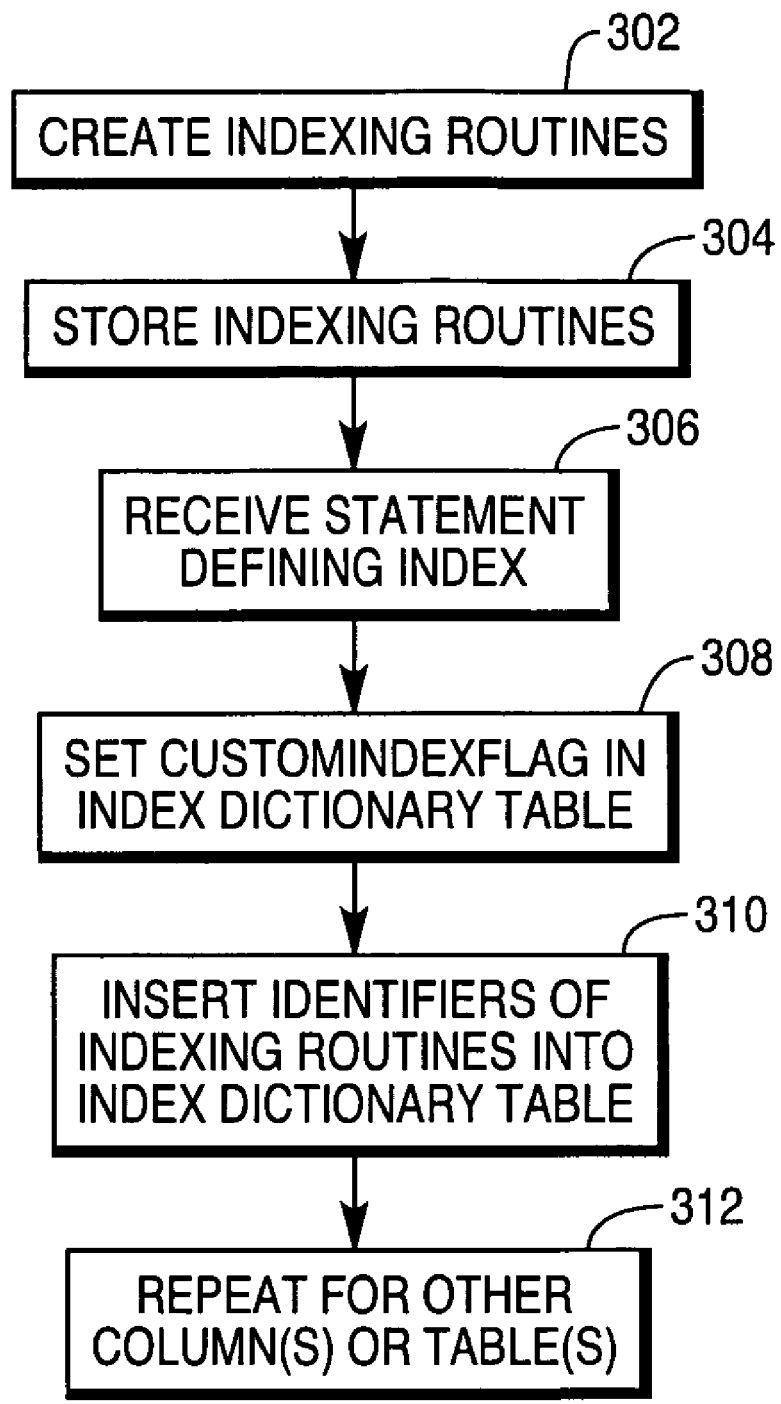
FIG. 4 is a flow diagram of a process for enabling customized indexing of a table column, in accordance with an embodiment.

FIG. 4 shows a flow diagram of a process of supporting customized indexing for a UDT. First, indexing routines are created (at 302) according to one or more footprints provided with the database software. The creation of indexing routines at 202 is performed by the user of the database software, rather than the database software vendor (according to some implementations). Note that the user created indexing routines can alternatively be developed based on collaboration between users and the database software vendor. The user created indexing routines are stored (at 304) in the storage 28 (FIG. 1).

The database software next receives (at 306) a statement to define or create an index on a table column. An example statement to define an index on a table column is as follows:

CREATE INDEX <index_name>(<column_name>[, <column_name>]) ON<table_name>[<customized indexing clause>];

In the statement above, <table_name> is a character string that represents the name of a base table; and <column_name> is a character string representing the name of a column in the table. The <customized indexing clause> has the following format, according to one embodiment:

<customized indexing clause>::=
INSERT WITH <insert index storage routine>
UPDATE WITH <update index storage routine>
SEARCH WITH <index search routine>

Note that <insert index storage routine>, <update index storage routine>, and <index search routine> refer to the indexing routines discussed above. The <customized indexing clause> is included to enable the maintenance and use of customized indexes with the identified indexing routines.

In response to receiving the above statement, the database software sets (at 308) CustomIndexFlag to a true state in a corresponding row of the index dictionary table. Note that a new row is created in the index dictionary table if the CREATE INDEX statement is submitted for creating indexes on a new table column that was previously not indicated as being enabled for indexing. Also, the database software inserts (at 310) identifiers of the indexing routines (identified in the CREATE INDEX statement) into corresponding columns of the corresponding row of the index dictionary table. The tasks of 302-310 are repeated (at 312) for other columns or tables.

The following provides an example of how a user can enable the creation of customized indexing on an example table column (PhotoId column) in an example table (ExampleTable). To create ExampleTable, the following example CREATE TABLE statement is submitted:

CREATE TABLE ExampleTable (SocialSecurityNumber INTEGER, Name VARCHAR(80), (PhotoId IMAGEUDT, Salary DECIMAL(8,2));

In the example given, in addition to the PhotoId column, the other columns of ExampleTable include SocialSecurityNumber, Name, and Salary. Note that the PhotoId column is a UDT referred to as "IMAGEUDT," which indicates that the PhotoId column contains image objects. In this example, customized indexing is defined for the PhotoId column. To do so, indexing routines for the PhotoId column are created by the user using the following series of example CREATE FUNCTION statements (with additional actual code to define tasks to be performed by respective routines):

CREATE FUNCTION My_Custom_Index_Insert_Routine (DataColumnValue IMAGEUDT, RowIdentifier BYTE(6))
RETURNS VARCHAR(256)
LANGUAGE C
NO SQL
EXTERNAL
PARAMETER STYLE SQL;
CREATE FUNCTION My_Custom_Index_Update_Routine (DataColumnValue IMAGEUDT, OldRowIdentifier BYTE(6), NewRowIdentifier BYTE(6))
RETURNS VARCHAR(256)
LANGUAGE C
NO SQL
EXTERNAL
PARAMETER STYLE SQL;
CREATE FUNCTION My_Custom_Index_Search_Routine (SearchValue IMAGEUDT, Sequence INTEGER)
RETURNS VARBYTE(64K)
LANGUAGE C
NO SQL
EXTERNAL
PARAMETER STYLE SQL;

In the example series of statements above, the user-defined function (UDF) My_Custom_Index_Insert_Routine is an index insert routine used for updating an index table in response to an SQL INSERT statement in which a data value DataColumnValue (of data type IMAGEUDT) is inserted into a row having row identifier RowIdentifier. The My_Custom_Index_Update_Routine UDF is an index update routine for updating an index table in response to an SQL UPDATE or DELETE statement. The new data value to be inserted is represented as DataColumnValue, the old row to be deleted from the index table has row identifier OldRowIdentifier, and the new row to be inserted into the index table has row identifier NewRowIdentifier.

The My_Custom_Index_Search_Routine is an index search routine for searching an index table for a particular data value (contained in SearchValue of data type IMAGEUDT). Another parameter passed to the My_Custom_Index_Search_Routine is a Sequence parameter, which has a non-zero value to indicate that additional row(s) containing the data value indicated by SearchValue is (are) present in the index table so that additional call(s) of the My_Custom_Index_Search_Routine should be made. Note that a given data value may be associated with multiple row identifiers in the index table (which means that more than one row contains the same data value of the column on which indexing is defined).

Figure 5:
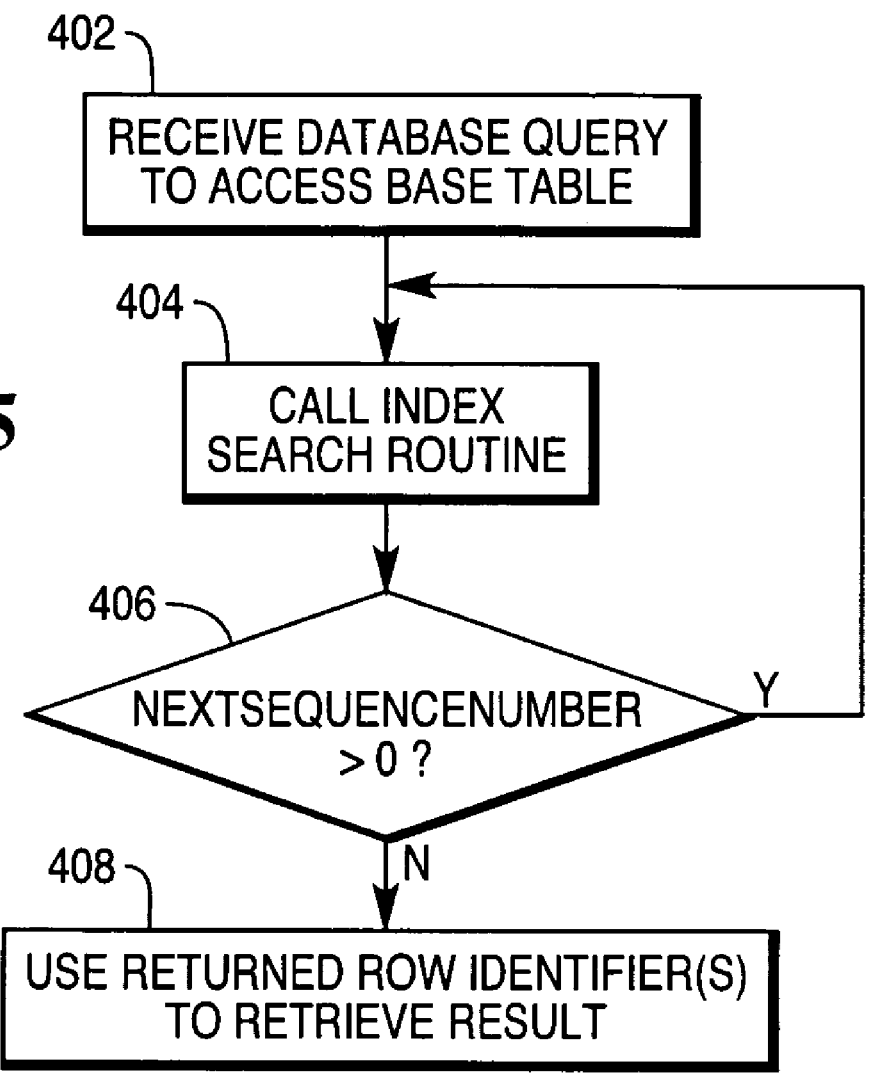
FIG. 5 is a flow diagram of a process for searching a customized index, in accordance with an embodiment.

To enable creation of indexing on column PhotoId of ExampleTable, the following example statement is submitted:

CREATE INDEX MyCustomIndex (PhotoId)
ON ExampleTable INSERT WITH My_Custom_Index_Insert_Routine
UPDATE WITH Update My_Custom_Index_Update_Routine
SEARCH WITH My_Custom_Index_Search_Routine;

FIG. 5 illustrates a process according to an embodiment that is performed in response to a database query that accesses a base table, where the query contains a predicate against an index column on which customized indexing is defined. In response to receiving (at 402) of such a query, the database software calls (at 404) a corresponding index search routine. In this initial call to the index search routine, the Sequence parameter passed to the index search routine contains a zero value. The return from the index search routine will contain a return value that is decoded as follows:

{NextSequenceNumber INTEGER, IndexDataRow VARBYTE(64K—sizeof(INTEGER))}

In this return value, the parameter NextSequenceNumber contains a sequence number for indicating whether additional rows matching the data value passed to the index search routine exists. The parameter IndexDataRow contains the identifier of a row containing the data value passed to the index search routine.

The database software next determines (at 406) if the parameter NextSequenceNumber is greater than zero. If so, then that indicates that additional rows exist that contain the specified data value, and another call is made (at 404) to the index search routine. In this subsequent call to the index search routine, the value of parameter NextSequenceNumber is passed as the Sequence parameter to the index search routine. A return value from this subsequent call of the index search routine will contain the parameter NextSequenceNumber decremented by the value one to indicate that one less row exists that contains the specified value. If the parameter NextSequenceNumber is equal to 0, then that indicates that there are no more rows containing the specified data value. The database software then uses (at 408) the row identifier(s) of row(s) containing the data value to retrieve the result rows from the base table.

Again, in a parallel database system environment such as that depicted in FIG. 1, the index search routine is called by each access module to perform a search of a respective portion of the distributed index table containing customized index.

Instructions of the various software routines or modules discussed herein (such as the database software and user created indexing routines) are loaded for execution on corresponding processors (such as CPUs 34 in FIG. 1). The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in one or more storage devices, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system, comprising;
   storing a dictionary table to indicate that customized indexing is to be maintained for a first table column according to a user-defined data type (UDT), the dictionary table further associating the first table column with user created indexing routines for manipulating the customized indexing, wherein the dictionary table has a first row corresponding to the first table column, the first row containing a first flag to indicate that the customized indexing is to be maintained for the first table column;
   providing a second row in the dictionary table corresponding to a second table column, the second row containing a second flag to indicate that customized indexing is not to be maintained for the second table column; and
   in response to a query, accessing an index table containing the customized indexing, wherein the customized indexing has a first format that differs from a predefined format for indexing defined by database software in the database system.

2. The method of claim 1, wherein the user created indexing routines comprise a first routine to update the customized indexing in response to inserting a row into a base table containing the first table column, a second routine to update the customized indexing in response to updating a row in the base table, and a third routine to search the customized indexing for a particular data value of the first table column.

3. The method of claim 2, wherein accessing the index table is performed with a selected one of the first, second, and third routines.

4. The method of claim 2, wherein accessing the index table is performed with the third routine in response to receiving a query containing a predicate containing the first table column.

5. The method of claim 2, wherein accessing the index table is performed with the second routine in response to receiving a query to update an entry in the base table or to delete an entry in the base table.

6. The method of claim 2, wherein storing the data dictionary comprises storing the data dictionary having identifiers of the first, second, and third routines.

7. An article comprising at least one storage medium containing instructions that when executed cause a database system to:
   store a user-customized index in a storage, the user-customized index defined on at least one column of a first table;
   setting a first indicator in a dictionary table to indicate that customized indexing is enabled for the at least one column of the first table, the dictionary table to further identify a user-defined routine;
   setting a second indicator in the dictionary table that customized indexing is not to be enabled for a column of a second table; and
   in response to modification of the first table, invoke the user-defined routine identified in the dictionary table to update the user-customized index;
   wherein the instructions when executed cause the database system to further receive a database query specifying the user-defined routine to be used for manipulating the user-customized index, wherein the user-defined routine identified by the dictionary table is invoked by database software instead of a predefined routine provided with the database software for manipulating indexing in response to the first indicator being set to indicate that customized indexing is enabled.

8. The article of claim 7, wherein receiving the database query comprises receiving the database query that also specifies a second user-defined routine, the second user-defined routine to search the user-customized index for a particular data value.

9. The article of claim 8, wherein receiving the database query comprises receiving a CREATE INDEX statement.

10. The article of claim 7, wherein the database query specifies that the customized indexing is to be enabled for the at least one column of the first table.

11. The article of claim 10, wherein the instructions when executed cause the database system to further receive a database query to create the user-defined routine.

12. The article of claim 7, wherein the at least one column of the first table has a user-defined data type (UDT).

13. The article of claim 7, wherein storing the user-customized index comprises storing the user-customized index in a native file system of an operating system of the database system.

14. The article of claim 7, wherein storing the user-customized index comprises storing the user-customized index in a file system of database software in the database system.

15. A database system comprising:
   a storage to store a relational table containing a first column; and
   a controller to:
      receive a database query specifying indexing routines to be used for manipulating an index for the first column;
      associate the indexing routines with the first column; and store a dictionary table containing a first indicator to indicate that customized indexing is to be enabled for the first column of the relational table, the dictionary table further containing a second indicator to indicate that customized indexing is not to be enabled for a second column;

wherein the dictionary table further contains identifiers of the indexing routines, wherein the first indicator and identifiers are stored in a first row of the dictionary table, wherein the storage further stores a second relational table containing a column, and wherein the dictionary table further contains a second row containing a third indicator and a second set of identifiers, the third indicator to indicate that customized indexing is enabled for the column of the second relational table, and the second set of identifiers to identify a second set of indexing routines for manipulating an index for the column of the second relational table, and where the dictionary table further contains a third row containing the second indicator.

16. The database system of claim 15, the controller to further;

receive a second database query; and in response to the second database query, invoke one of the indexing routines to access the index.

\* \* \* \* \*